United States Patent [19]
Heck et al.

[11] Patent Number: 4,844,837
[45] Date of Patent: * Jul. 4, 1989

[54] CATALYTIC PARTIAL OXIDATION PROCESS

[75] Inventors: Ronald M. Heck, Frenchtown, N.J.; Paul Flanagan, Northboro, Mass.

[73] Assignee: Engelhard Corporation, Menlo Park, N.J.

[*] Notice: The portion of the term of this patent subsequent to Nov. 20, 2001 has been disclaimed.

[21] Appl. No.: 430,451

[22] Filed: Sep. 30, 1982

[51] Int. Cl.$^4$ .................................................. C01B 3/36
[52] U.S. Cl. ...................................................... 252/373
[58] Field of Search ................ 518/703, 704; 252/373, 252/477 R

[56] References Cited

U.S. PATENT DOCUMENTS

| | | | |
|---|---|---|---|
| 2,683,152 | 7/1954 | Dickinson | 518/703 |
| 2,964,551 | 12/1960 | Woolcock | 518/703 |
| 3,048,476 | 8/1962 | Dwyer | 252/373 |
| 3,763,205 | 10/1973 | Green | 252/373 |
| 4,168,945 | 9/1979 | Kirby | 252/477 R |
| 4,233,187 | 11/1980 | Atwood et al. | 252/373 |

FOREIGN PATENT DOCUMENTS 56-62542  5/1981  Japan ............................. 252/477 R

*Primary Examiner*—Bruce D. Gray

[57] ABSTRACT

A method and apparatus for carrying out partial oxidation of hydrocarbon feeds to produce hydrogen rich gases suitable for steam reforming, utilizes a monolithic platinum and palladium containing catalyst. The process comprises introducing an oxygen containing oxidant gas (e.g., air), steam and a hydrocarbon feed into a catalytic partial oxidation apparatus comprising an adiabatic reaction vessel. The oxidation catalyst preferably comprises platinum, palladium and optionally rhodium distended upon a stabilized alumina washcoat. At least one half by weight of the hydrocarbon feed is catalytically oxidized in the monolith at a high throughput rate to produce an effluent suitable for further processing, such as steam reforming.

12 Claims, 1 Drawing Sheet

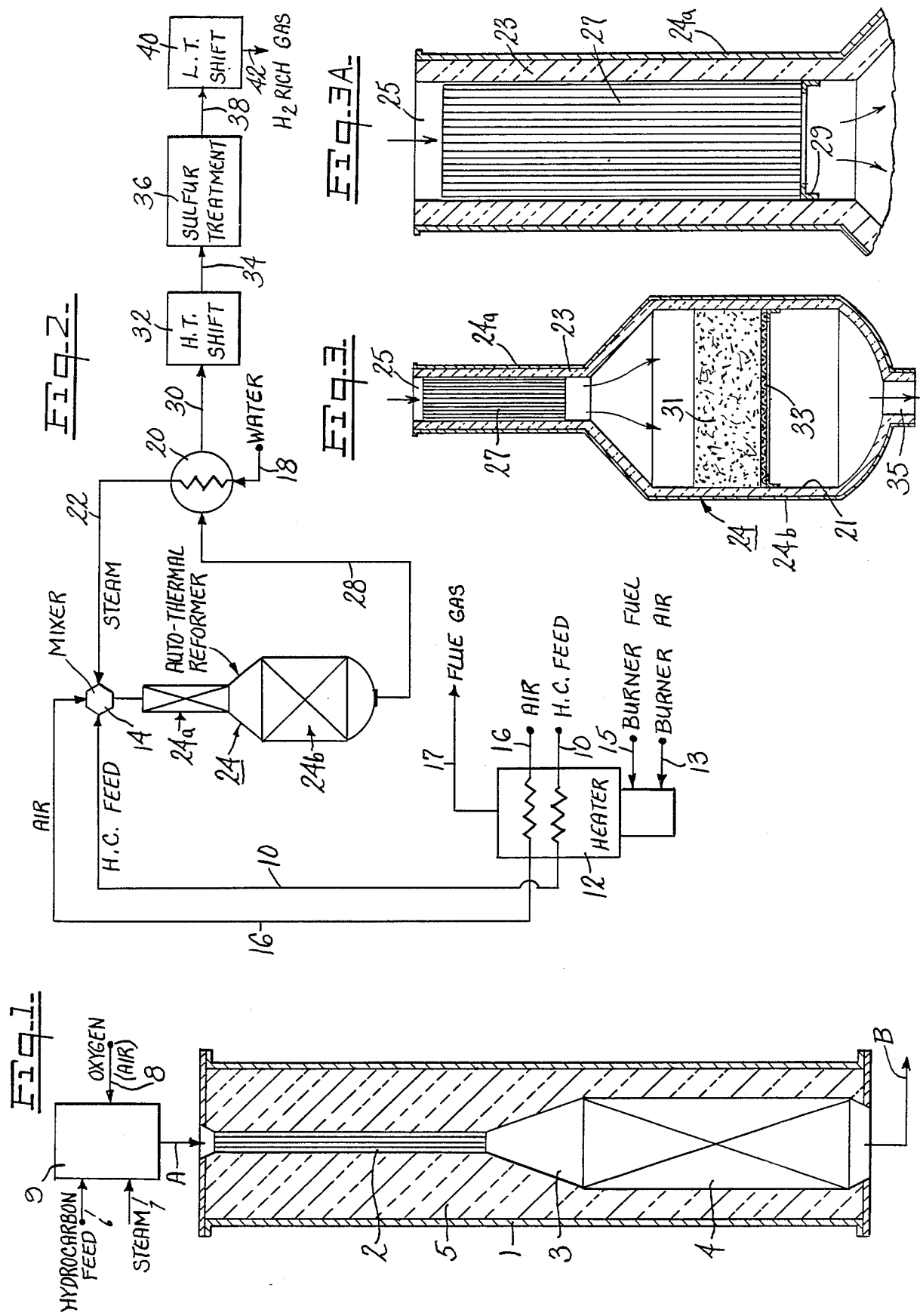

CATALYTIC PARTIAL OXIDATION PROCESS

BACKGROUND OF THE INVENTION

Steam reforming is a well known method for generating hydrogen from light hydrocarbonn feeds and is carried out by supplying heat to a mixture of steam and a hydrocarbon feed while contacting the mixture with a suitable catalyst, usually nickel. The steam reforming reaction may be represented as:

$$H_2O + C_xH_y = CO + H_2$$

with the following equilibria tending to become established $$CO + H_2O = CO_2 + H_2$$

$$CO + 3H_2 = CH_4 + H_2O$$

so that the overall reaction, which is endothermic, may be summarized as:

$$H_2O + C_xH_y = CO + CO_2 + H_2$$

Steam reforming is generally limited to paraffinic naphtha and lighter feeds which have been de-sulfurized and treated to remove nitrogen compounds, because of difficulties in attempting to steam reform heavier hydrocarbons and the poisoning of steam reforming catalysts by sulfur and nitrogen compounds. Thus economical methods have been needed to convert heavier feeds to hydrogen-rich gases which are suitable for steam reforming.

Another known method of obtaining hydrogen from a hydrocarbon feed is the partial oxidation process in which the feed is introduced into an oxidation zone maintained in a fuel rich mode so that only a portion of the feed is oxidized. The partial oxidation reaction may be represented as:

$$C_xH_y + O_2 = CO + H_2$$

Steam may also be injected into the partial oxidation reactor vessel to react with the feed and with products of the partial oxidation reaction. The process is not catalytic and requires high temperatures to carry the reactions to completion, resulting in a relatively high oxygen consumption. On the other hand, the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineers' 90th National Meeting, Houston, Texas, April 5-9, 1981. Autothermal reforming is defined therein as the utilization of catalytic partial oxidation in the presence of added steam, which is said to increase the hydrogen yield because of simultaneous (with the catalytic partial oxidation) steam reforming being attained. The paper discloses utilization of a particulate bed of nickel catalyst into which steam, air and a hydrocarbon fuel supply comprising a No. 2 fuel oil are injected to produce a gas containing hydrogen and carbon oxides.

In *Brennstoff-Chemie* 46, No. 4, p. 23 (1965), a German publication, Von P. Schmulder describes a Badische Anilin and Soda Fabrik (BASF) process for autothermal reforming of gasoline. The process utilizes a first, pelletized, i.e., particulate, platinum catalyst zone followed by a second, pelletized nickel catalyst zone. A portion of the product gas is recycled to the process.

Disclosure of the utilization of a noble metal catalyzed monolith to carry out a catalytic partial oxidation to convert more than half of the hydrocarbon feed stock upstream of a stream reforming zone is disclosed in an abstract entitled "Evaluation of Steam Reforming Catalysts for use in the Auto-Thermal Reforming of Hydrocarbon Feed Stocks" by R. M. Yarrington. I. R. Feins, and H. S. Hwang (National Fuel Cell Seminar, San Diego, July 14–16, 1980.) The paper noted the unique ability of rhodium to steam reform light olefins with little coke formation and noted that results were obtained for a series of platinum-rhodium catalysts with various ratios of platinum to total metal in which the total metal content was held constant.

U.S. Pat. No. 4,054,407, assigned to the assignee of this application, discloses two-stage catalytic combustion platinum group metal catalytic components dispersed on a monolithic body. At least the stoichiometric amount of air is supplied over the stages and steam is not employed.

U.S. Pat. No. 3,481,722, assigned to the assignee of this application, discloses a two-stage process for steam reforming normally liquid hydrocarbons using a platinum group metal catalyst in the first stage. Steam and hydrogen, the latter of which may be obtained by partially cracking the hydrocarbon feed, are combined with the feed to the process.

The catalytic partial oxidation process of the present invention provides a highly efficient method for producing hydrogen-rich gases from hydrocarbons which attains excellent yields in a relatively compact and simple apparatus. These hydrogen-rich gases produced are particularly suitable for steam reforming as compared to the feed to the catalytic partial oxidation unit.

SUMMARY OF THE INVENTION

In accordance with the present invention there is provided a method for producing a hydrogen-rich gas which comprises the following steps (a) through (d). (a) Preheating an inlet stream comprising a hydrocarbonaceous feed, $H_2O$ and an oxygen-containing oxidant gas to a preheat temperature at least sufficiently high to initiate catalytic oxidation of the hydrocarbonaceous feed as defined below. (b) Introducing the preheated inlet stream into a catalyst comprising a monolithic body having a plurality of gas flow passages extending therethrough and having a catalytically effective amount of palladium and platinum catalytic components dispersed therein, the amounts of hydrocarbon, $H_2O$ and oxygen introduced into the first catalyst zone being controlled to maintain in the inlet stream a $H_2O$ to C ratio at least about 0.5, and an $O_2$ to C ratio of at least about 0.2 but less than the stoichiometric amount of oxygen necessary to oxidize all the carbon of the feed to $CO_2$. (c) Containing the preheated inlet stream within the catalyst monolith with the palladium and platinum catalytic component to initiate and sustain therein catalytic oxidation of at least a sufficient quantity of the hydrocarbon feed to attain an elevated temperature within the first castalyst zone at least high enough to crack unoxidized C₅ or heavier hydrocarbons, if any be present, to light hydrocarbons not heavier than C₄ hydrocarbons, the temperature of at least a portion of said monolithic body being at least about 250° F. 139° C. higher than the ignition temperature of said inlet stream whereby to produce an effluent comprising hydrogen, carbon oxides and the light hydrocarbons. (d) Withdrawing the effluent as a hydrogen-rich gas.

In accordance with another aspect of the present invention, the elevated temperature attained in step (c) is high enough so that hydrocarbons remaining in the effluent may be catalytically steam reformed without necessity of supplying external heat thereto.

Other aspects of the invention provide one or more of the following features: The hydrocarbonaceous feed is a hydrocarbon feed, the monolithic catalyst comprises palladium and, optionally, rhodium catalytic components distended upon a refractory metal oxide support layer carried on a refactory monolithic body. The platinum group metal catalytic component of the monolithic catalyst comprises, on an elemental metal basis, about 10 to 90% by weight palladium, 90 to 10% by weight platinum, more preferably about 25 to 75% by weight palladium, about 75 to 25% by weight platinum.

In still more preferred embodiments, the catalytically active metal species in the catalyst comprises from about 40 to about 60% by weight of platinum and from about 60 to about 40% by weight of palladium. A volumetric hourly rate of at least 100,000 volumes of throughput per volume of catalyst is maintained in the catalyst monolith. The preheated inlet stream is preheated to a temperature of from about 800° F. to 1400° F. (427° to 760° C.) upon introduction into the catalytic partial oxidation zone. The catalytic partial oxidation zone is maintained at a temperature of from about 1500° F. to 2400° F. (816° C. to 1316° C.) and the effluent from the catalytic partial oxidation zone effluent is maintained at substantially the same temperature, whereby it may easily be steam reformed. The amounts of hydrocarbonaceous feed, H₂O and oxygen introduced into the catalytic partial oxidation zone are controlled to provide therein an O₂ to C ratio of from about 0.2 to 0.8 and an H₂O to C ratio of about 0.5 to 5. The process is carried out at a pressure of from about atmospheric pressure to about 2000 psig.

BRIEF DESCRIPTION OF THE DRAWINGS

FIG. 1 is a schematic elevation view in cross section of a laboratory or pilot plant size embodiment of an autothermal reformer embodying a catalytic partial oxidation apparatus in accordance with the present invention;

FIG. 2 is a flow sheet diagram of a plant illustrating one method of integrating the catalytic partial oxidation process of the present invention into an industrial plant for production of a hydrogen-rich gas;

FIG. 3 is an enlarged schematic elevation view in cross section of a commerical plant sized embodiment of an autothermal reformer employing a catalytic partial oxidation apparatus in accordance with the invention suitable for use in the plant diagrammed in FIG. 2; and FIG. 3A is an enlarged, partial view of the catalytic partial oxidation portion of the apparatus of FIG. 3.

DESCRIPTION OF THE PREFERRED EMBODIMENTS

In a preferred embodiment of the present invention, catalytic partial oxidation, an exothermic reaction, takes place in a catalyst monolith having platinum and palladium dispersed thereon to produce a gas which is rich in carbon monoxide and hydrogen. Some steam reforming appears to take place as well and thereby moderates somewhat the temperature attained in the monolith inasmuch as the endothermic steam reforming absorbs some of the heat generated by the partial oxidation step. The net reaction in the catalytic partial oxidation zone is however exothermic and the zone is therefore also referred to as an exothermic catalyst zone. The exothermic, catalytic partial oxidation zone comprises a monolithic catalyst carrier on which a platinum group metal catalyst is dispersed. Such catalyst can effectively catalyze the partial oxidation of, in addition to gaseous and lighter hydrocarbon liquids such as natural gas or paraffinic naphtha, heavier hydrocarbon liquids such as diesel oil, number 2 fuel oil, and coal derived liquids. As compared to a non-catalytic combustion process such as conventional, non-catalytic partial oxidation, catalytic partial oxidation as described above enables the utilization of lesser amounts of oxygen and lower temperature levels to both oxidize a portion of the feed and crack heavier feedstocks to lighter hydrocarbon fractions, while raising the temperature of the reacant mass for subsequent treatment. Tenerally, at least about half the hydrocarbon feed stock is partially oxidized in the catalytic partial oxidation zone to produce primarily carbon monoxide and hydrogen and heat which may be subsequently utilized for endothermic steam reforming. Substantially all of the oxygen introduced into the catalytic partial oxidation zone is consumed in the caatalytic partial oxidation step. The oxygen may be provided by any suitable "oxygen-containing oxidant gas" which term is used in the claims to include air, air enriched with oxygen, oxygen or oxygen mixed with other gases. At the temperatures maintained in the catalytic oxidation zone, and in the presence of the product hydrogen and catalyst utilized in the first zone, a degree of hydrocracking of uozidized C₅ and heavier hydrocarbon feed takes place to form C₄ and lighter compounds. The effluent gas from the catalytic partial oxidation zone contains primarily CO, H₂, H₂O, N₂, C₂ to C₄ and other lighter hydrocarbons, including olefins, and, depending upon the sulfur content of the feed stock, H₂S and COS.

The combination of features provided by the present invention provides a highly efficient and flexible method of converting various types of hydrocarbonaceous feeds to a hydrogen-rich gas. For example, the combination of features provided by the process of the present invention provides a highly efficent process of manufacturing a synthesis gas by converting various types of hydrocarbonaceous feeds, including hydrocarbon feeds, to a nitrogen and hydrogen-rich gas suitable for use in ammonia synthesis. By utilizing the catalytic partial oxidation process as described, a wide variety of hydrocarbonaceous feeds may be efficiently and economically converted into a hydrogen-rich gas. In addition to petroleum and coal derived hydrocarbons, biomass-derived feeds providing carbon-containing compounds such as methane, and/or hydrogen, oxygen and nitrogen in compounds or as elements, may be treated in accordance with the invention. Such hydrocarbonaceous feeds may, like hydrocarbon feeds, also contain sulfur or sulfur compounds. If the sulfur content of the feed is sufficiently high, the sulfur treatment zone as illustrated in FIG. 2 will normally be required. If oxygen and/or nitrogen are present in the hydrocarbonaceous feed in appreciable amounts, they can provide at least a portion of the "air" for the process, and the atmospheric air or other gas introduced to the process can be reduced accordingly. The use of the monolithic palladium and platinum containing partial oxidation catalyst provides a great flexibility in handling diverse feedstocks, including heavy hydrocarbon feedstocks not normally suited for generating a hydrogen-containing synthesis gas.

The low pressure drop and high volumetric rate throughput of a monolithic body supported catalsyt provides a reduced size an volume of catalyst in the first catalyst zone. The use of platinum group metals as the catalytic metal facilitates a very low catalytic metal loading as compared to use of base metal catalyst. This provides good overall economies in reduced equipment size and enhanced throughout rates despite the much higher cost of platinum group metals as compared to base metals. The monolithic platinum palladium metal partial oxidation catalyst provides a great flexibility in handling diverse feedstocks and in producing a hydrogen-rich gas having characterisitics disigned for a specific purpose. Utilization of platinum group metal catalysts enables operation at relatively very low $H_2O$ to C and $O_2$ to C ratios without carbon desposition fouling the catalysts.

The Monolithic Partial Oxidation Catalyst

The partial oxidation catalyst is provided on a monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert rigid material which is capable of maintaining its shape and a sufficient degree of mechanical strength at high temperatures, for example, up to about 3,272° F. (1,800° C.). Typically, a material is selected for the support which exhibits a low thermal coefficient of expansion, good thermal shock resistance and, though not always low thermal conductivity. Two general types of material of construction for such carriers are known. One is a ceramic-like porous material comprised of one or more metal oxides, for example, alumina, alumina-silca, alumina-silcia-titania, mullite, cordierite, zirconia, zirconia-spinal, zirconia-mullite, silcon carbide, etc. A particularly preferred and commercially avialable material of construction for operations below about 2,000° F. (1,093° C.) is cordierite, which is an alumina-magnesia-silcia material. For applications involving operations above 2,000° F. (1,093° C.), an alumina-silica-titania material is preferred. Honeycomb monolithic supports are commerically available in various sizes and configurations. Typically, the monolithic carrier would comprise, e.g., a cordierite member of generally cylindrical configuration (either round or oval in cross section) and having a plurality of parallel gas flow passages or regular polygonal cross section extending therethrough. The gas flow passages are typically sized to provide from about 50 to 1,200, perferably 200 to 600, gas flow channels per square inch of face area.

The second major type of preferred material of construction for the carrier is a heat- and oxidation-resistant metal, such as a stainless steel or the like. Monolithic supports are typically made from such materials by placing a flat and a corrugated metal sheet one over the other and rolling the stacked sheets into a tubular configuration abut an axis parallel to the corrugations, to provide a cylindrical-shaped body having a plurality of fine, parallel gas flow passages extending therethrough. The sheets and corrugations are sized to provide the desired number of gas flow passages, which may range, typically, from about 50 to 1,200 per square inch of end face area of the tubular roll.

Although the ceramic-like metal oxide materials such as cordierite or alumina-silica-titania are somewhat porous and rough-textured, they nonetheless have a relatively low surface area with respect to catalyst support requirement and, of course, a stainless steel or other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, III, and IV of the Periodic Table of Elements having atomic numbers not greater than 40 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina such as the gamma (preferred), chi, eta, kappa, theta and delta forms and mixtures thereof. One or more stabilizers such as rare earth metal oxides and/or alkaline earth metal oxides may be included in the transition alumina (usually in amounts comprising from 2 to 10 weight percent of the stabilized coating) to stabilize it against the generally undesirable high temperature phase transition to alpha alumina, which is of a relatively low surface area. For example, oxides of one or more of lanthanum, cerium, praseodymium, calcium, barium, strontium and magnesium may be used as a stabilizer. The specific combination of oxides of lanthanum and barium is a preferred stablilzer.

The catalytic partial oxidation catalyst may contain rhodium in addition to platinum and palladium. The platinum group metal may optionally be supplemented with one or more base metals, particularly base metals of Group VII and metals of Groups VB, VIB of the periodic Table of Elements. Preferably, one or more of chromium, copper, vanadium, cobalt, nickel and iron may be thus employed.

Desirable catalysts for partial oxidation should have the following properties: They should be able to operate effectively under conditions varying from oxidizing at the inlet to reducing at the exit; they should operate effectively and without significant temperature degradation over a temperature range of about 800° F. to about 2400° F. (427° C. to 1315° C.); they should operate effectively in the presence of carbon monoxide, olefins and sulfur compounds; they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poisons as sulfur and halogen compounds; further, all of these requirements must be satisfied simultaneously. For example, in some otherwise suitable catalysts, carbon monoxide may be retained by the catalyst metal at low temperatures thereby decreasing or modifying its activity. The combination of platinum and palladium is a highly efficient oxidation catalyst for the purposes of the present invention. Generally, the catalytic activity of platinum-palladium combination catalysts is not simply an arithmetic combination of their respective catalyic activities; the disclosed range of proportions of platinum and palladium have been found to possess the previously described desirable qualities and in particular provide efficient and effective catalytic activity in treating a rather wide range of hydrocarbonaceous, particularly hydrocarbon, feeds with good resistance to high temperature operation and catalyst poisons.

The following data compare the effectiveness of palladium, rhodium and platinum, respectively, for the oxidation of methane and further compares the efficacy of, respectively, palladium-platinum, palladium-rhodium and platinum-rhodium combined catalysts for oxidation of methane.

The catalysts of Table I-A comprise a lanthia-chromia-alumina frit impregnated with the platinum group metals by techniques as described above. The frit has the following composition:

| Component | Weight Percent |
|---|---|
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four hours at 1600° F. Three catalysts of different platinum metal loadings were prepared as follows:

| Sample No. | Weight Percent | | | |
|---|---|---|---|---|
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 |

The resultant platinum group metal (PGM) impregnated alumina frit was deposited on alumina beads and the thus-coated beads were placed in a shallow bed and tested by passing a 1% (volume) methane 99% (volume) air feed at about atmospheric pressure through the catalyst. An electric heater was used to cyclically heat the test gas stream fed to the catalyst, and conversion result at the indicated temperatures were obtained on both the heating and cooling phase of each heat cycle.

The results are shown in the following Table I-A.

TABLE I-A

| Sample No. | PGM (Mole Ratio) | Ignition Temp. °F. | Weight Percent of Original Methane Content Converted at Indicated Temperature (°F.) | | | | | |
|---|---|---|---|---|---|---|---|---|
| | | | 600° | 700° | 800° | 900° | 1000° | 1100° |
| 4063 U-1 | Pd;Pt (1:1) | 610 | — | 3 | 10 | 26 | 60 | 80 |
| 4063 R-1 | Pd;Rh (1:1) | 710 | — | — | 2 | 5 | 9 | 12 |
| 4063 V-1 | Pt;Rh (1:1) | 730 | — | — | 1 | 1 | 3 | 5 |

These data demonstrate the ability of platinum palladium catalyst to promote catalytic oxidation of methane over a wide range of temperatures.

Rhodium may optionally be included with the platinum and palladium. The combined platinum group metal catalysts of the invention also have a significant advantage in the ability to catalyze the reactions at quite low ratios of $H_2O$ to carbon (atoms of carbon in the feed) and oxygen to carbon, without significant carbon deposition on the catalyst. This important feature provides flexibility in selecting $H_2O$ to C and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present or as compounds such as an oxide of the platinum group metal. As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form. Table I-A demonstrates that the palladium-rhodium and platinum-rhodium combinations are rather ineffective for methane oxidation. The effectiveness of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well above 1100° F., which would probably also reduce the effectiveness of rhodium for methane oxidation.

The tests in which the results of Table I-A were developed used a bed of the platinum group metal-impregnated frit dispersed on alumnina beads, rather than a monolithic body on which the frit is dispersed. The bed of frit-coated beads was of shallow depth to avoid excessive pressure drop. The geometric configuration of a 400 cell/in$^2$ monolithic body provides more geometric surface area exposed to the reactant gas than does a bed of coated beads. The catalytic partial oxidation reactions of this invention are extremely rapid at the temperatures involved. Therefore, the catalytic metals on the surface of the catalyst body are predominantly involved in the reactions. The results of the test with coated beads are indicative of results with monolithic bodies, but lower catalytic metal loading can be used with the latter as compared to metal loadings on beads, to attain equivalent results.

Table I-B shows the results of testing a monolithic body-supported catalyst on which a ceria-stabilized alumina frit impregnated with the indicated platinum group metals was dispersed upon a monolithic support. The alumina frit comprised 5% by weight $CeO_2$, balance $Al_2O_3$, impregnated with one or two platinum group metals to provide the loadings indicated in Table I-B. The catalyst was calcined in air at 500° C. for two hours and then was aged 24 hours at 1800° F. in air.

Two different test gases, A and B, having the following compositions were passed through the catalyst:

|  | PARTS PER MILLION (VOL) OR VOLUME PERCENT | |
|---|---|---|
| COMPOSITION | A | B |
| $O_2$ | 3% | 3% |
| CO | 1% | 1% |
| $CO_2$ | 10% | 10% |
| $H_2O$ | 10% | 10% |
| NO | 500 ppm | 500 ppm |
| $C_2H_4$ | 300 ppm | — |
| $C_3H_8$ | — | 300 ppm |
| $N_2$ | balance | balance |

Table I-B indicates the temperature in degrees centigrade necessary for conversion of 50% by weight of the original amount of the component present, indicated under the column heading $T_{50}$, and the temperature required for 75% by weight conversion, under the heading $T_{75}$. A lower temperature accordingly indicates a more active catalyst. The results obtained are as follows; the platinum group metal (PGM) loading on the monolithic support is shown as grams of platinum group metal per cubic inch of monolithic catalyst.

TABLE I-B

| | PGM | | |
|---|---|---|---|
| Catalyst Sample No. | Weight Ratio Pt:Pd | PGM Loading Pt/Pd (g/in$^3$) | Total PGM Loading (g/in$^3$) |
| 1. | 100:00 | 0.51/— | .051 |
| 2. | 82:18 | .044/.010 | .054 |
| 3. | 58:42 | .027/.019 | .046 |
| 4. | 25:75 | .011/.031 | .042 |
| 5. | 0:100 | —/.039 | .039 |
| 6. | 11:89 | .003/.025 | .028 |
| 7. | 100:0 | .035/— | .035 |
| 8. | 70:30 | .034/.014 | .048 |

| | Test Gas A | | Test Gas B | |
|---|---|---|---|---|
| Component | CO | $C_2H_4$ | CO | $C_3H_8$ |
| Percent Conversion | $T_{50}\ T_{75}$ | $T_{50}\ T_{75}$ | $T_{50}\ T_{75}$ | $T_{50}\ T_{75}$ |
| Catalyst Sample No. | °C. | °C. | °C. | °C. |
| 1. | 325 335 | 325 355 | 265 275 | 470 565 |
| 2. | 270 275 | 280 290 | 280 285 | 545 615 |
| 3. | 235 250 | 260 305 | 260 265 | 495 640 |
| 4. | 235 245 | 260 320 | 260 270 | 465 585 |
| 5. | 230 235 | 245 270 | 245 255 | 440 510 |
| 6. | 270 275 | 275 315 | 245 255 | 430 555 |
| 7. | 345 355 | 350 365 | 320 330 | 495 550 |
| 8. | 255 265 | 265 290 | 245 250 | 485 585 |

The data of Table I-B demonstrates the lower temperatures at which a palladium containing catalyst will attain, respectively, 50% and 75% conversion of ethylene as compared to a platinum only catalyst. As mentioned above, the presence of platinum in addition to palladium provides effective catalyzation of other species as well as providing enhanced poison resistance.

An exemplary mode of preparation of partial oxidation catalyst compositions utilizable in accordance with the present invention is set forth in the following Example 1.

EXAMPLE 1

(a) To 229 g of 5 wt % $CeO_2$ - 95 wt % $Al_2O_3$ powder (a predominatly gamma alumina which has been stabilized by incorporation of ceria therein) is added a solution containing 21 g Pt as $H_2Pt(OH)_6$ solubilized in monoethanolamine so as to give total volume of 229 ml. After mixing for 5 minutes, 25 ml of glacial acetic acid is added and the material is mixed an additional 5 minutes before being dried and then calcined for one and one-half hours at 350° C. in air to form a free flowing powder.

(b) Similarly, to 229 of 5 wt % $CeO_2$ - 95 wt % $Al_2O_3$ powder there is added 21g Pd as $Pd(NO_3)_3$. The material is mixed and reduced with 16 ml of $N_2H_4 \cdot H_2O$ solution with constant mixing. The impregnated powder is dried and then calcined for one and one-half hours at 375° C. in air.

(c) Two hundred grams of each of powder (a) and (b) is added to a ½ gallon size ball mill with appropriate amount of grinding media. To the powder is added 20 ml of glacial acetic acid and 550 ml of $H_2O$. The sample is ball milled for 16 hours. The resulting slurry has a solids content of 43%, a pH of 4.0 and a viscosity of 337 cps and is used to coat a Corning cordierite monolith having a diameter of 3.66", a length of 3" and 400 gas flow passages (of square cross section) per square inch of end face area. The coating is acomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238 g of platinum group metal per cubic foot of catalyst body volume at a weight ratio of platinum to palladium of 1:1, with the platinum group metal dispersed on a ceria-stabilized alumina "washcoat" support layer. The catalyst body contains 1.4 grams per cubic inch of catalyst body of stabilized alumina washcoat.

A series of partial oxidation catalyst compositions utilizeable in accordance with the present invention were prepared by substantially the procedure described in Example 1, with aparopriate modifications to obtained the reported loadings of different catalyst metals. Each of the below described materials is a monolithic catalyst composition. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark TORVEX by DuPont, and having 64 gas flow channel per square inch of end face area. The Corning cordierite monoliths have gas flow channels which are square in cross section; those of the TORVEX monolith are hexaegonal in cross section. The amount of platinum group metal on the catalyst is given in grams of elemental platinum group metal per cubic foot of monolith catalyst. The weight ratio of the platinum group metals in the order listed is given in parentheses. Thus, catalyst CPO-1 in Table 1, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft$^3$ | Weight % and Stabilizer in Support Coating | Alumina Support coating g/in$^3$ (% Stabilizer) |
|---|---|---|---|---|
| CPO-1 | Pt;Pd(1:1) | 219 | 5% ceria | 1.27 |
| CPO-2 | Pt;Pd(1:1) | 186 | 5% ceria | 1.64 |
| CPO-3 | Pt,Pd(1:4) | 275 | 5% ceria | 1.79 |
| CPO-4 | Pt,Pd(1:0) | 310 | 5% ceria | 2.32 |
| CPO-5* | Pt,Pd(1:1) | 200 | 5% ceria | 1.26 |
| CPO-6 | Pt,Pd,Rh | 230 | 5% ceria | 1.47 |

TABLE I-continued

| Catalyst | PG Metal Component | PG Metal g/ft³ | Weight % and Stabilizer in Support Coating | Alumina Support coating g/in³ (% Stabilizer) |
|---|---|---|---|---|
| CPO-7 | (9.5:9.5:1) Pt,Pd(1:1) | 186 | 2.5% lanthia 2.5% baria | 1.64 |

*TORVEX alpha alumina monolith; all others are cordierite monoliths.

Preferred catalyst metals are platinum and palladium and combinations thereof, preferably, combinations comprising about 10–90% by weight palladium, preferably 25–75%, more preferably 60 to 40%, by weight palladium, and about 90 to 10% by weight platinum, preferably 75 to 25%, more preferably 40% to 60%, by weight platinum. Generally, as the sulfur content of the hydrocarbon feed being treated increases, a higher proportion of platinum to palladium is preferred. On the other hand, for feeds which have a relatively high methane content, an increasing proportion of palladium is preferred.

The monolithic configuration of the partial oxidation catalyst affords a relatively low pressure drop across it as compared to the packed bed of a particulate support catalyst. This is particularly important in view of the increase in gas volume occasioned by the reactions taking place in the first catalyst zone. The total moles of product produced in the monolith is higher than the total moles of $H_2O$, oxidant gas and hydrocaron feed introduced therein. The individual gas flow passages of the monolith also serve, in effect, as individual akiabatic chambers, thus helping to reduce heat loss and promote hydrocracking. This is particularly so when the monolithic carrier comprises a ceramic-like material such as cordierite which has generally better heat insulating properties than do the metal substrates and, to this extent, the ceramic-type monolithic carriers are preferred over the metal substrate monolithic carriers. Further, as the monolith body becomes heated during operation, the gas in the upstream portion of the monolith is preheated by the heat which is transferred back from the downstream catalytic partial oxidation to the inlet portion of the monolith, thus facilitating desired hydrocracking and oxidation reactions.

Steam reforming catalyst which are useful in conjunction with the catalytic partial oxidation process of the present ivention may be prepared as set forth in the following Example 2.

EXAMPLE 2

(a) A barium nitrate solution is prepared by dissolving 159.9 g $Ba(NO_3)_2$ in 1,1650 ml of $H_2O$. Lanthanum nitrate, in the amount of 264.9 g $La(NO_3)_2.6H_2O$ is dissolved in the barium nitrate solution by mixing vigoruosly to yield a barium-lanthanum solution, to which is added to 3,000 g of high surface area gamma alumina powder. The solution and powder are thoroughly mixed in a sigma blade mixer for 30 minutes.

(b) The impregnated alumina resulting from step (a) was extruded through 1/16" diameter dies so as to give 1/16" diameter extrudate in lengths from 1/4" to 3/8".

(c) The extrudates from step (b) were dried at 110° C. for 16 hours and then calcined 2 hours at 1,050° C. in air.

(d) A platinum-rhodium solution was prepared by dissolving 42.0 g Pt as $H_2Pt(OH)_6$ in monoethanolamine and 18.0 g Rh as $Rh(NO_3).2H_2O$ and combining the materials in $H_2O$ to provide a solution having a volume of 1,186 ml and a pH of 0.7 after adjustment with concentrated $HNO_3$.

(e) The platinum-rhodium solution of step (d) is added to the extrudate obtained in step (c) in a tumbling coater mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on a $La_2O_3$-BaO stabilized gamma alumina extrudate.

Preferred embodiments embodying the partial catalytic oxidation apparatus of the present invention are described in some detail below.

The Reactor Vessel

Preferably, the reactor utilized in the process of the invention comprises a fixed bed, adiabatic reactor. FIG. 1 shows a somewhat schematic rendition of a preferred laboratory or pilot plant size reactor comprising a unitary vessel 1 within which a monolithic carrier partial oxidation catalyst 2 is disposed in flow communication via a passageway 3 with a bed of steam reforming catalyst 4. The vessel is suitably insulated by thermal insulating material 5 to reduce heat losses and to provide essentially a fixed bed, adiabatic reactor. Inlet lines 6, 7 and 8 feed a mixer 9 with, respectively, a hydrocarbon feed, steam and oxygen. The latter may be introduced as an oxygen containing gas, preferably air. The admixed reactants are introduced through an inlet line A into partial oxidation catalyst 2, thence via passage 3 into steam reforming bed 4 from which the contacted material is withdrawn through outlet line B. Valves, flow meters and heat exchange units, utilized in a manner known to those skilled in the art, are not shown in the schematic illustration of FIG. 1.

In order to exemplify the suitable of the present catalyst partial oxidation process for producing a feed gas which may be readily steam reformed, test runs were carried out in an apparatus substantially in accordance with that schematically illustrated in FIG. 1, in which the monolithic carrier catalyst 2 was of cylindrical configuration, three quarters of an inch in diameter and nine inches long. The steam reforming bed was a cylindrical bed of particulate catalyst three inches in diameter by nine and a quarter inches long. The following test runs were carried out and the indicated results obtained. In operation, the reactants were preheated with the oxidant stream being preheated separately from the hydrocarbon feed as a safety measure. After preheating, the streamc were intimately mixed and immediately fed into the partial oxidation catalyst 2 of vessel 1. Generally, all the oxygen present in the feed reacts within monolithic catalyst bed 2 to oxidize a portion, but not all, of the hydrocarbon feed, resulting in an increase in temperature due to the exothetmic oxidation reaction. At least some of the $C_5$ and heavier hydrocarbon is hydrocracked in catalyst bed 2 to lighter, $C_1$ to $C_4$ hydrocarbon fractions. The heated, partially oxidized and hydrocracked effluent from catalyst bed 2 is then passed through steam reforming catalyst bed 4 wherein the steam reforming reaction takes place. The product gases withdrawn via outlet B are cooled and unreacted water as well as any unreacted hydrocarbon feed is condensed and removed therefrom. The dry gas composition was monitored by gas chromatography. A series of test runs were conducted as shown by the numbered Examples below.

Referring now to FIG. 2, there is shown schematic illustration of an autothermal reforming plant utilized to provide a hydrogen-rich gas from a hydrocarbon feed. A source of a hydrocarbon feed, e.g., No. 2 fuel oil, a coal derived liquid, JP-4 or a lighter feed such as a paraffinic naphtha, is passed via a line 10 through a heater 12 for preheating, and is passed thence to a mixer 14 for admixture with air and steam as described below. Heater 12 is supplied with air and a suitable fuel through, respectively, lines 13 and 15, and flue gas is withdrawn via stack line 17. Air is introduced via a line 16 which also passes through heater 12 for preheating and is passed thence to mixer 14. Water, which may be preheated in heater 12, is introduced via line 18 into heat exchanger 20 wherein it is heated by heat exchange with the effluent emerging from the autothermal reformer 24, as described below. Superheated steam is generated in heat exchanger 20 and passed via steam line 2 into mixer 14. The heated mixture of air, steam and hydrocarbon feed obtained in mixer 14 is introduced via inlet line 26 into autothermal reformer 24. Heater 12 may be omitted if sufficient heat is available in the superheated steam to provide the sensible heat to the air and hydrocarbon streams.

In reformer 24 the mixture of fuel, steam and air is passed initially through a catalytic partial oxidation cataysł supported on a monolithic honycomb carrier Disposed within neck portion 24a of a reformer 24. Some, preferably at least one half by weight, but not all of the hydrocarbon feed is catalytically oxidized within the first catalyst zone contained within neck portion 24a and any $C_5$ or heavier unoxidized hydrocarbons are hydrocracked to ligher constituents, $C_1$ to $C_4$ hydrocarbons, including olefins. The effluent from the first catalyst zone may then be passed into a second, steam reforming catalyst zone contained within main body portion 24b of reformer 24, to convert residual hydrocarbons to hydrogen and carbon oxides.

Referring to FIG. 3, a schematic enlarged cross sectional view of reformer 24 shows that it comprises a steel pressure vessel 21 which has thermal insulation 23 affixed on the interior surfaces thereof the reduce heat losses from vessel 21. An inlet opening 25 is positioned at the upstream end of neck portion 24a, i.e., the end opposite the downstream end of neck 24a. ("Upstream" and "downstream" as used herein and in the claims is used as sensed with reference to the general direction of gas flow through the reformer unit.) Amonolithic catalyst 27, having its gas flow passage oriented vertically, as shown in FIG. 3A, is mounted within neck 24a by means comprising a circular flange 29 (see FIG. 3A) welded or otherwise affixed within neck portion 24a.

A bed 31 of particulate steam reforming catalyst is supported by means comprising a screen 33 (which may comprise a formation plate) welded or otherwise affixed to, or supported within, the interior of main body portion 24b. A supporting flange (not shown) may be affixed to the interior of body portion 24 to support screen 33 in a removable manner within body portion 24. Cross bars (not shown) may serve to strengthen screen 33. An outlet opening 35 is provided in main body portion 24b, downstream of catalyst bed 31.

The respective diameters of monolithic catalyst 27 and catalyst bed 31 are approximately those of the inside diameter of, respectively, portions 24a and 24b of reformer 24 so that substantially all the gas flow (indcated in FIG. 3 by the unmarked arrows) through reformer 24b is constrained to pass through both catalyst beds. The following Examples demonstrate that the catalytic partial oxidation process of the present invention produces gases which are suited to steam reforming to produce hydrogen-rich gases.

EXAMPLE 3

(a) A monolithic partial oxidation catalyst made in accordance with Example 1 has the following composition:

186 grams of platinum group metal (PGM) per cubic foot of catalyst volume, the PGM comprising platinum and palladium in a 1:1 weight ratio. The PGM is distended upon a lanthia-baria stabilized predominatly gamma alumina washcoat dispersed on a Corning cordierite monolityh ¾ inch (1.9 cm) in diameter and 9 inches (22.9 cm) in length, and having 400 gas flow passages per square inch of end face area. The monolith is loaded with 1.64 g of washcoat per cubic inch of catalyst volume.

(b) A steam reforming catalyst is provided by 1,075 ml of catalyst SR-1 of Example 2, in a packed bed measuring 3 inches (7.62 cm) in diameter and 9 ¼ inches (23.5 cm) in depth.

(c) The hydrocarbon feed is a No. 2 fuel oil having the following properties:
API Gravity: 34.7
Distillation Range: 374–664° F.
Sulfur Content: 1,200 parts per million (weight)
Hydrocarbon classes per ASTM D1319:
Aromatics: 22.0%
Olefins: 5.7%
Saturates: 72.3%

(d) The reactor vessel is a fixed bed, adiabatic reactor of the type schematically illustrated in FIG. 1. For safety considerations, the oxidant stream, comprising air, is preheated separately from the hydrocarbon stream in a preheater (not shown in FIG. 1). The steam is separated into two streams, one of which is blended with the oxidant steam and one with the hydrocarbon feed. The preheated streams are intimately mixed within a mixer, schematically illustrated at 9 in FIG. 1, and immediately fed to the partial oxidation catalyst. The partial oxidation catalyst. The partial oxidation catalyst (2 in FIG. 1) in the first catalyst zone contains the monolithic catalyst zone contains the SR-1 catalyst of (b), above.

The amounts of steam, air and hydrocarbon feed introduced to the process are controlled to provide a molar ratio of $H_2O$ to C of 2.56 and a molar ratio of $O_2$ to C of 0.41. All of the limited amount of oxygen contained in the inlet feed is completely reacted and a sufficient amount of the hydrocarbon is oxidized to heat the reactant mass by the exothermic catalytic oxidation reaction to a temperature high enough for steam reforming. The flowed into the steam reforming catalyst 4 and then withdrawn via the outlet opening as indicated by the arrow B in FIG. 1.

The product gas is cooled and unreached water (and unreacted hydrocarbon oil) is condensed therefrom. The dry gas composition is monitored by gas chromatography and the following results were measured and the results tabulated in Table II.

TABLE II

| A. Effluent Composition and Hydrocarbon Conversion | | |
|---|---|---|
| Constituents of | Dried Product Gas Composition, Mole % | |
| Dried Product Gas | As Measured | $N_2$ Free Basis |
| $H_2$ | 39.6 | 63.3 |

TABLE II-continued

| | | |
|---|---|---|
| CO | 8.7 | 13.9 |
| $CO_2$ | 14.2 | 22.7 |
| $N_2$ | 37.4 | — |
| $CH_4$ | 0.06 | 0.1 |
| $C_2H_6$ | 0 | 0 |
| $C_2H_4$ | 0 | 0 |
| Hydrocarbon Conversion | 99.7%* | 99.7%* |

B. Throughput and Temperatures

Volumetric throughput rate, volumes of throughput at standard temperature and pressure per volume of catalyst per hour:

| | |
|---|---|
| monolithic partial oxidation catalyst (item = 2 in FIG. 1) | 126,000 |
| particulate steam reforming catalyst (item = 4 in FIG. 1) | 6,500 |
| Interstage temperature (between items 2 and 4 of FIG. 1) | 861° C. |
| Preheat Temperature (line A of FIG. 1) | 690° C. |
| Exit Temperature (line B of FIG. 1) | 733° C. |

*weight percent of quantity of hydrocarbon feed to the reactor.

In each of the Examples 3–7, identical conditions were employed, except as specifically otherwise indicated, to autothermally reform a hydrocarbon feed.

The following Examples 4 demonstrates that the effluent from the catalytic partial oxidation process of the present invention is also suited to steam reforming using a commercially available nickel steam reforming catalyst.

EXAMPLE 4

The same hydrocarbon feed as employed in Example 3 was utilized, and the following steam reforming catslyst, commercially avialable from United Catalysts, Inc. under the designation G9OC, was substituted for the steam reforming catalyst of paragraph (b) of Example 3.

| G9OC Catalyst | |
|---|---|
| Composition: | Properties: |
| Ni 15.4 weight % | Surface area: 16.2 m²/g |
| Ca 0.21 weight % | Compacted bulk density: 1.2 g/ml |
| $Al_2O_3$ balance | Total porosity (Hg): 0.215 ml/g |
| | Tablet shape, measuring ⅛ inch by ⅛ inch (0.32 cm by 0.32 cm) |

The molar ratio of $H_2O$ to C was 2.59 and the molar ratio of $O_2$ to C was 0.41.

The results tabulated in Table III were attained.

TABLE III

| Constituents of Dried Product Gas | Dried Product Gas Composition, Mole % | |
|---|---|---|
| | As Measured | $N_2$ Free Basis |
| $H_2$ | 34.5 | 58.8 |
| CO | 11.5 | 19.6 |
| $CO_2$ | 11.9 | 20.3 |
| $N_2$ | 41.3 | — |
| $CH_4$ | 0.75 | 1.28 |
| $C_2H_6$ | 0.01 | 0.02 |
| $C_2H_4$ | 0.01 | 0.02 |
| Hydrocarbon Conversion | 96.7%* | 96.7%* |

B. Throughput and Temperatures

Volumetric throughput rate, volumes of throughput at standard temperature and pressure per volume of catalyst per hour:

| | |
|---|---|
| monolithic partial oxidation catalyst (item = 2 in FIG. 1) | 126,000 |
| particulate steam reforming catalyst (item = 4 in FIG. 1) | 6,500 |
| Interstage temperature (between items 2 and 4 of FIG. 1) | 997° C. |
| Preheat Temperature (line A of FIG. 1) | 690° C. |
| Exit Temperature (line B of FIG. 1) | 793° C. |

*weight percent of quantity of hydrocarbon feed to the reactor.

A comparison of the results of Table II with those of Table III shows that the catalytic partial oxidation process also provides an effluent which is well suited for a steam reforming using nickel catalyst even though the nickel catalyst in the steam reforming section is not as effective for converting the effluent from the catalytic partial oxidation of No. 2 fuel oil. As indicated by the results in Table II, when the platinum-rhodium steam reforming catalyst was used, nearly 100% conversion of No. 2 fuel oil was attained, as compared to 96.7% when the nickel catalyst was used in accordance with the invention. Also, although not reported in the Tables, when the nickel catalyst was employed, a rapid increase in reactor pressure drop was observed. This could have been due to soot accumulation on the nickel steam reforming catalyst. The platinum group metal catalysts were able to operate much closer to the theoretical soot line with respect to $H_2O$ to C and $O_2$ to C ratios, without significant soot deposition. It appears that the platinum group metal catalysts may catalyze a carbon oxidation reaction which (such as the steam/carbon reaction) prevents or at least limits soot accumulation on the catalyst.

The following Example illustrates the separate use of the catalytic partial oxidation process of the present invention.

EXAMPLE 5

The procedure of Example 3 was repeated except that the composition of the effluent from the catalytic partial oxidation monolith was determined directly, without being passed through a steam reforming catalyst.

TABLE IV

| Constituents of Dried Product Gas | Dried Product Gas Composition, Mole % | |
|---|---|---|
| | As Measured | $N_2$ Free Basis |
| $H_2$ | 26.82 | 50.38 |
| CO | 21.08 | 39.59 |
| $CO_2$ | 3.95 | 7.42 |
| $N_2$ | 46.76 | — |
| $CH_4$ | 0.95 | 1.78 |
| $C_2H_6$ | 0.04 | 0.08 |
| $C_2H_4$ | 0.31 | 0.58 |
| $C_3H_6$ | 0.08 | 0.15 |
| $C_4=$ | 0.01 | 0.02 |
| Hydrocarbon Conversion | 85%* | 85%* |

B. Throughput and Temperatures

Volumetric throughput rate, volumes of throughput at standard temperature and pressure per volume of catalyst per hour:

| | |
|---|---|
| monolithic partial oxidation catalyst (item = 2 in FIG. 1) | 126,000 |
| particulate steam reforming catalyst (item 4 in Fig. 1) | NOT APPLICABLE |
| Preheat Temperature (line A of FIG. 1) | 690° C. |
| Exit Temperature (line B of FIG. 1) | 861° C. |

*weight percent of quantity of hydrocarbon feed to the reactor.

As indicated by the results tabulated in Table IV, only about 15% of the original feed stock is unconverted, approximately 85% by weight of the original hydrocarbon feed being oxidized (and/or steam reformed and cracked) in the catalytic partial oxidation zone. The effluent is high in olefin content, and contained H₂S and COS as well as the most refractory portions of the hydrocarbon feed. Thus, it can be appreciated that the catalytic partial oxidation process of the present invention is capable of forming an effluent which is capable of being steam reformed from No. 2 fuel oil.

The suitability of the catalytic partial oxidation process of the present invention for use with a wide variety of steam reforming catalysts is well illustrated in Table V by the data set forth below. Table V gives the compositions of a number of reforming catalysts. The catalysts were used to steam reform the effluent obtained from a catalytic partial oxidation unit. Table VI shows the amount of conversion of the hydrocarbon feed and the type of hydrocarbon left unreacted. A value of zero under the heading "Unreacted HC Type" means 100% conversion of the hydrocarbon type specified. Thus, the composition of the effluent obtained from the first (catalytic partial oxidation) catalyst zone should be taken into consideration in selecting the specific platinum group metals utilized in the steam reforming catalyst. Platinum group metal steam reforming catalysts are not always required for the steam reforming catalyst used in accordance with the invention, inasmuch as for some feeds and operating conditions a base metal steam reforming catalyst may suffice.

TABLE V

| Catalyst | Catalytically Active Metals as Weight Percent of Catalyst | | |
|---|---|---|---|
|  | Ni | Pt | Rh |
| SR-1 | — | 1.4 | 0.6 |
| SR-3 | — | 1.4 | 0.6 |
| SR-7 | 14.5 | — | 0.5 |
| SR-11 | 15.4 | — | — |
| SR-12 | 14.5 | 0.35 | 0.15 |
| SR-13 | — | — | 2.0 |
| SR-14 | — | 1.0 | 1.0 |
| SR-16 | — | 1.7 | 0.3 |
| SR-18 | — | 2.0 | — |
| SR-19 | 15.0 | — | 0.5 |
| SR-20 | — | 1.4 | 0.6 |
| SR-22 | 14.5 | — | 0.5 |

All compositions except SR-11 comprise gamma-alumina pellets measuring approximately 1/16 inches (0.16 cm) in diameter, stablized with 5 weight percent lanthia-baria. SR-11 is the commercially available catalyst G90C of Example 4, and SR-19 uses this commercially available catalyst as a base, to which the indicated catalytic metal is added.

TABLE VI

Hydrocarbon feed: No. 2 fuel oil.
Preheat Temperature (line B of FIG. 1) = 482° C.

| Run No. | Catalyst No. | O₂ to C Ratio | H₂O to C Ratio | HC[a] Conv., % | Untreated HC Type | |
|---|---|---|---|---|---|---|
|  |  |  |  |  | CH₄[b], % | Olefins[c], % |
| 7348 | SR-16 | 0.41 | 2.58 | 97.8 | 2.2 | 0.0 |
| 7238 | SR-1 | 0.44 | 2.72 | 96.9 | 3.1 | 0.0 |
| 7251 | SR-1 | 0.41 | 2.67 | 95.3 | 4.7 | 0.0 |
| 7344 | SR-14 | 0.41 | 2.58 | 96.6 | 3.3 | 0.0 |
| 7331 | SR-13 | 0.41 | 2.59 | 96.0 | 3.9 | 0.0 |
| 7328 | SR-18 | 0.41 | 2.60 | 95.4 | 2.3 | 1.6 |
| 7242 | SR-3 | 0.43 | 2.71 | 95.3 | 4.5 | 0.0 |
| 7340 | SR-20 | 0.41 | 2.58 | 95.1 | 2.7 | 0.0 |
| 7271 | SR-7 | 0.42 | 2.68 | 93.5 | 5.5 | 0.6 |
| 7255 | SR-12 | 0.43 | 2.65 | 91.6 | 7.3 | 0.7 |
| 7298 | SR-19 | 0.42 | 2.66 | 91.3 | 5.8 | 2.4 |
| 7365 | SR-22 | 0.42 | 2.57 | 91.0 | 5.4 | 2.6 |
| 7293 | SR-11 | 0.43 | 2.66 | 90.7 | 5.4 | 3.4 |
| 7307 | SR-11 | 0.42 | 2.66 | 89.0 | 6.0 | 4.6 |

[a] HC Conversion = $(CO + CO_2)_p/C_p$;
[b] Unreacted CH₄ = $(CH_4)_p/C_p$
[c] Unreacted Olefins = $(Olefins)_p/C_p$
(In all cases, subscript p indicates composition in the product stream.)

The following examples illustrate operation of the catalytic partial oxidation process of the present invention in preferred modes for specific hydrocarbon feed stocks.

EXAMPLE 6

A hydrocarbon feed stocck comprising JP-4 was partially oxidized catalytically then the effluent was steam reformed with the same catalysts as employed in Example 3. The properties of the feed stock were:

API Gravity: 54.4
Sulfur Content: 30 ppm (weight)
Boiling Range: 138°–450° F.
Aromatics Content: 15.5 weight percent The H₂O to carbon ratio was 2.65 and the O₂ to carbon molar ratio was 0.425.

The results obtained are tabulated in Table VII below.

TABLE VII

| Constituents of Dried Dried Product Gas | Dried Product Gas Composition, Mole % | |
|---|---|---|
|  | As Measured | N₂ Free Basis |
| H₂ | 38.66 | 62.21 |
| CO | 10.74 | 17.28 |
| CO₂ | 12.71 | 20.45 |
| N₂ | 37.86 | — |
| CH₄ | 0.03 | 0.05 |
| Hydrocarbon Conversion | 99.9%* | 99.9%* |

B. Throughput and Temperatures

| Volumetric throughput rate, volumes of throughput at standard temperature pressure per volume of catalyst per hour: | |
|---|---|
| monolithic partial oxidation catalyst (item = 2 in FIG. 1) | 131,000 |
| particulate steam reforming catalyst (item = 4 in FIG. 1) | 7,050 |
| Interstage Temperature (between items 2 and 4 of FIG. 1) | 924° C. |
| Preheated Temperature (line A of FIG. 1) | 749° C. |
| Exit Temperature (line B of FIG. 1) | 823° C. |

*weight percent of quantity of hydrocarbon feed to the reactor

EXAMPLE 7

A Liquid Petroleum Gas (LPG) feed stock was partially oxidized catalytically then steam reformed with the same catalysts as employed in Example 3. The composition of the feed stock was:

|  | Mole % |
|---|---|
| Ethylene | 4.60 |
| Propane | 70.17 |
| Propylene | 25.07 |
| i-Butane | 0.15 |
| n-Butane | 0.01 |

The feed stock was not desulfurized for the test. The H$_2$O to C ratio was 3.11 and the O$_2$ to C ratio was 0.50. The results obtained are listed in Table VIII below.

TABLE VIII

| Constituents of | Dried Product Gas Composition, Mole % | |
| --- | --- | --- |
| Dried Product Gas | As Measured | N$_2$ Free Basis |
| H$_2$ | 39.41 | 65.38 |
| CO | 8.78 | 14.57 |
| CO$_2$ | 12.09 | 20.05 |
| N$_2$ | 39.72 | — |
| CH$_4$ | 0.00 | 0.00 |
| Hydrocarbon Conversion | 100%* | 100%* |

| B. Throughput and Temperatures | |
| --- | --- |
| Volumetric throughput rate, volumes of throughput at standard temperature and pressure per volume of catalyst per hour: | |
| monolithic partial oxidation catalyst (item = 2 in FIG. 1) | 145,000 |
| particulate steam reforming catalyst (item = 4 in FIG. 1) | 7,800 |
| Interstage Temperature (between items 2 and 4 of FIG. 1) | 906 |
| Preheat Temperature (line A of FIG. 1) | 749° C. |
| Exit Temperature (line B of FIG. 1) | 837° C. |

*weight percent of quantity of hydrocarbon feed to the reactor.

While the invention has been described in detail with respect to specific preferred embodiments thereof, it will be appreciated that those skilled in the art, upon a reading and understanding of the foregoing will readily envision modifications and variations to the preferred embodiments which are nonetheless within the spirit and scope of the invention of the claims.

What is claimed is:

1. A process for producing a hydrogen-rich gas comprises:
    (a) preheating an inlet stream comprising a hydrocarbonaceous feed, H$_2$O and an oxygen-containing oxidant gas to a preheat temperature at least sufficiently high to initiate catalytic oxidation of said hydrocarbonaceous feed as defined below;
    (b) introducing the preheat inlet stream into a catalyst zone comprising a monolithic body having a plurality of gas flow passages extending therethrough and having a catalytically effective amount of palladium and platinum catalytic components dispersed therein, the amounts of hydrocarbon byproduct, H$_2$O and oxygen introduced into said first catalyst zone being controlled to maintain in said inlet stream an H$_2$O to C ratio of at least about 0.35, and an O$_2$ to C ratio of at least about 0.2 but less than the stoichiometric amount of oxygen necessary to oxidize all the carbon of said feed to CO$_2$;
    (c) contacting the preheated inlet stream within said catalyst zone with said palladium and platinum catalytic component to initiate an sustain therein catalytic oxidation of at least a sufficient quantity of said hydrocarbon feed elevated temperature within said catalyst zone at least high enough to crack unoxidized C$_4$ hydrocarbons, the temperature of at least a portion of said monolithic body being at least about 250° F. (139° C.) higher than the ignition temperature of said inlet stream, whereby to produce a catalyst zone effluent comprising, predominantly, hydrogen, carbon oxides and said light hydrocarbons; and
    (d) withdrawing the first catalyst zone effluent as a hydrogen-rich gas.

2. The process of claim 1, wherein the hydrocarbonaceous feed is a hydrocarbon feed.

3. The process of claim 1, wherein said catalyst zone comprises palladium, platinum and, optionally, rhodium catalytic components distended upon a refractory metal oxide support layer carried on said monolithic body.

4. The process of claim 3 wherein the metal catalytic component of said catalyst zone comprises, on an elemental metal basis, about 10 to 90% by weight palladium, 90 to 10% by weight platinum.

5. The process of claim 4 wherein said catalytic component of said catalyst zone comprises about 25 to 75% by weight palladium, about 75 to 25% by weight platinum.

6. The process of claim 3 wherein the catalytic component of the catalyst zone comprises on an elemental metal basis from about 60 to about 40% platinum and from about 40% to about 60% by weight palladium.

7. The process of claim 1, or claim 2 wherein a volumetric hourly rate of at least 100,000 volumes of throughput per volume of catalyst is maintained in said catalyst zone.

8. The process of claim 1, or claim 2 wherein the preheated inlet stream is preheated to a temperature of from about 800° F. to 1400° F. (427° C. to 760° C.) upon introduction into said catalyst zone.

9. The process of claim 1, or claim 2 wherein said first catalyst zone is maintained at a temperature of from about 15° F. to 2400° F. (816° C. to 1316° C.).

10. The process of claim 2 wherein said first catalyst zone is maintained at a temperature of from about 1500° F. to 2400° F. (816° C. to 1316° C.) and the first catalyst zone effluent is maintained at substantially the same temperature.

11. The process of claim 1, or claim 2 wherein the amounts of hydrocarbonaceous feed, H$_2$O and oxygen introduced into said catalyst zone are controlled to provide therein an O$_2$ to C ratio of from about 0.2 to 0.8 and H$_2$O to C ration of about 0.5 to 5.

12. The process of claim 1, or claim 2 carried out at a pressure of from about atmospheric pressure to about 2000 psig.

* * * * *

UNITED STATES PATENT AND TRADEMARK OFFICE
CERTIFICATE OF CORRECTION

PATENT NO. : 4,844,837

DATED : 07/04/89

INVENTOR(S) : R. M. Heck, P. Flanagan

It is certified that error appears in the above—identified patent and that said Letters Patent is hereby corrected as shown below:

```
Column 2, Line 26, insert --using-- after "tion";
          Line 28, insert --two-- after "the";
          Line 61, insert --of-- after "ratio", first occurrence;
          Line 64, substitute --Contacting-- for [Containing].

Column 4, Line 30, substitute --Generally-- for [Tenerally];
          Line 44, substitute --unozidized-- for (uozidized).

Column 5, Line 7, insert --oxidant-- after "other";
          Line 16, substitute --and-- for "an";
          Line 21, substitute --throughput-- for "throughout";
          Line 30, substitute --deposition-- for "desposition".

Column 6, Line 7, substitute --about-- for "abut";
          Line 49, insert --and VIIB-- after "VIB".

Column 7, Line 55, substitute --phases-- for "phase".

Column 9, TABLE I B, Sample No. 1., under heading "Test Gas A",
          subheading "C2H4", substitute --325  335-- for [325  355]

Column 10, Line 33, substitute --appropriate--for "apparopriate";
           Lines 33 and 34, substitute --obtain-- for "obtained";
           Table I, Column heading "PG Metal Component", substitut
           --Pt,Pd(1:1)-- for [Pt;Pd(1:1)] in lines 1 and 2 of the
           table.

Column 11, Line 53, substitute --1,650-- for [1,1650];
```

UNITED STATES PATENT AND TRADEMARK OFFICE
CERTIFICATE OF CORRECTION

PATENT NO. : 4,844,837

DATED : 07/04/89

INVENTOR(S) : R. M. Heck, P. Flanagan

It is certified that error appears in the above—identified patent and that said Letters Patent is hereby corrected as shown below:

Column 12, Line 37, substitute --suitability-- for [suitable];
Line 37-38 substitute --catalytic-- for [catalyst];
Line 51, substitute --streams-- for [streamc];
Line 56, substitute --exothermic-- for [exothetmic].

Column 13, Line 28, substitute --disposed-- for [Disposed];
Line 55, substitute --foraminous-- for [formation].

Column 14, Line 45, between "catalyst" and "zone" insert:

--of (a), above, and the steam reforming catalyst (4 in Figure 1) in the second catalyst--";

Line 55, between "The" and "flowed" insert:

--effluent from the catalytic partial oxidation catalyst 2 is immediately --

Line 58, substitute --unreacted-- for [unreached].

Column 15, Line 21, insert --operating-- after "identical".

Column 17, Table VI, substitute --Unreacted HC Type-- for column heading [Untreated HC Type].

UNITED STATES PATENT AND TRADEMARK OFFICE
CERTIFICATE OF CORRECTION

PATENT NO. : 4,844,837
DATED : 07/04/89
INVENTOR(S) : R. M. Heck, P. Flanagan

It is certified that error appears in the above—identified patent and that said Letters Patent is hereby corrected as shown below:

Claim 1, Column 19, Line 48, substitute --0.5-- for [0.35];
         Column 19, Line 54, substitute --and-- for [an];
         Column 20, Line 1, insert after "feed", --to attain an--;

Column 20, Line 3, insert after "unoxidized"

--C5 or heavier hydrocarbons, if any be present, to light hydrocarbons not heavier than--.

Claim 9, Column 20, Line 41, substitute --1500°-- for [15°].

Claim 11, Column 20, Line 49, insert --first-- after "said";
                         Line 51, insert --an-- after "and";
                         Line 51, substitute --ratio-- for [ration].

Signed and Sealed this

Twenty-fifth Day of February, 1992

Attest:

HARRY F. MANBECK, JR.

*Attesting Officer*      *Commissioner of Patents and Trademarks*